Feb. 26, 1963

P. WINCHELL 3,079,160

GUIDEWAY SELECTOR FOR MULTI-TRACK RECORDS

Filed Feb. 3, 1961

INVENTOR.
PAUL WINCHELL
BY
[signature]
ATTORNEY 3,079,160

GUIDEWAY SELECTOR FOR MULTI-TRACK RECORDS

Paul Winchell, Whitestone, N.Y., assignor to Chelwin Productions, Inc., New York, N.Y., a corporation of New York Filed Feb. 3, 1961, Ser. No. 86,880
2 Claims. (Cl. 274—42)

This invention relates to the phonograph record art and particularly concerns means for facilitating the placement of a needle of a sound head upon a desired sound groove or track of a phonograph disk record.

According to the preferred form of the invention, the surface of the disk record having the sound track, adjacent the peripehry thereof, is formed with a countersunk portion, the base of the countersunk portion at one end being formed with V-shaped notches or cusps and with pilot or guide grooves leading from the apices of the notches or cusps to the desired sound tracks of the record disk. The base of the countersunk portion, the base of the pilot or guide grooves and the base of the sound tracks are flush. The other end of the base of the countersunk portion is smooth, serving as a gateway. The pilot or guide grooves will guide a phonograph needle into the desired sound track when the needle reaches a selected cusp.

In another form of the invention, a separate thin plastic adapter strip or tab is placed flatwise on the base of the countersunk portion and the tab itself is formed with the notches or cusps with pilot or guide grooves leading from the apices of the notches or cusps to the desired sound tracks on the disk record. In this form, the pilot or guide grooves gradually decrease from the apices of the notches or cusps to the desired sound tracks, with the base of the gateway flush with the outermost ends of the pilot or guide grooves on the strip or tab and with the innermost ends of the pilot or guide grooves flush with the bases of the sound tracks. The strip or tab is arranged so that it can be torn or cut to accommodate the strip or tab to single, double or triple track records.

The invention contemplates use with outwardly flaring sound track ends in which case the pilot or guide grooves are aligned with the flaring sound track ends.

A primary object of the invention therefore is to provide a phonograph disk record of the single or multiple sound track type with means for guiding the phonograph needle to the desired sound track on the disk record.

Another object of the invention is to provide a disk record with means formed integrally with the body of the record for guiding the phonograph needle to the desired sound track on the disk record.

A further object of the invention is to provide a disk record with separate means adapted to be attached to the disk record for guiding the phonograph needle to the desired sound track on the disk record.

A specific object of the invention is to provide a disk record with means cut into the sound track surface thereof adjacent its periphery forming pilot or guide grooves for guiding the phonograph needle to the desired sound track on the disk record.

It is a further object to provide means to facilitate placement of a phonograph needle on a desired sound track or turn of a sound track of a phonograph disk record.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
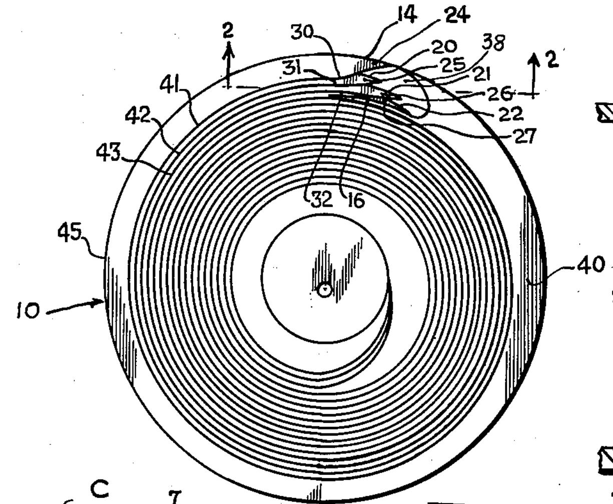
FIG. 1 is a top plan view of a phonograph disk record embodying one form of my invention, showing a three-sound track disk record.

Referring in detail to the drawings, a phonograph disk record embodying the preferred form of my invention is shown in FIG. 1 and is indicated generally at 10. The disk record has a thin circular body formed of suitable plastic material. On one surface, the body is formed with three concentric parallel sound tracks or grooves 41, 42 and 43.

Figure 2:
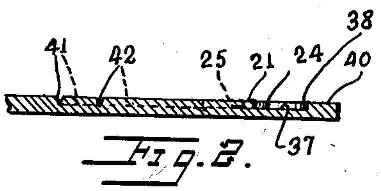
FIG. 2 is a horizontal sectional view taken on the line 2—2 of FIG. 1.

In accordance with the invention, at one point along the smooth ungrooved peripheral edge 40 of said one surface of the body, the surface is cut away or countersunk as indicated at 38 as best seen in FIG. 2. The starting ends of the sound tracks 41, 42 and 43 intersect one end of the countersunk portion. The countersunk portion has a smooth base portion 37 and has four V-shaped enlarged portions 24, 25, 26 and 27 projecting outwardly of the surface of the base and forming three V-shaped notches or cusps 20, 21 and 22, respectively. The surface of the enlargements is further cut forming pilot or guide grooves 30, 31 and 32 leading from the apices of the notches 20, 21 and 22, respectively, to the starting ends of the sound tracks 41, 42 and 43, respectively. The smooth base portion 37 of the countersunk portion serves as a gateway for guiding the phonograph needle into the notches or cusps.

The surface of the base portion 37, the bases of the pilot or guide grooves 30, 31 and 32 and the bases of the sound tracks 41, 42 and 43 are flush and the tracks and pilot grooves are continuous so that if a phonograph needle carried by a pickup device is placed between any pair of V-shaped portions 24, 25, 26 and 27 the needle will be guided into the respective notch and onto the respective pilot or guide groove 30–32 and then on to the selected sound track 41, 42 or 43, without any interference with the movement of the needle.

Instead of cutting the notches and pilot or guide grooves in the material of the disk record itself, the invention contemplates cutting the periphral edge 40 of the body of the disk record with the countersunk portion 38 and then enlarging the surface thereof at one end by attaching a flat plastic adapter strip or tab constituted by a thin film 11 of plastic or other suitable material. The underside of the strip is coated with a layer 15 of pressure-sensitive material. The strip has a straight end edge 12 extending radially or transversely to two parallel, curved side edges 14 and 16. The inner edge 16 has a smaller radius of curvature than the outer edge 14. Between edges 14 and 16 and at the outer end of the strip opposed to straight edge 12 are formed three cusps or notches 20′, 21′ and 22′. The cusps are defined by dividing the tab at one end into four pointed tips 24′, 25′, 26′ and 27′. The innermost tip 27′ adjoining edge 16 which forms one edge thereof is longest. The other tips 26', 25', 24' are progressively shorter, with edge 14 defining the outer edge of tip 24'. Three grooves 30', 31' and 32' are impressed in the upper surface of the strip or tab and extend from edge 12 to the respective apices of the notches or cusps 20', 21' and 22'.

Figure 5:
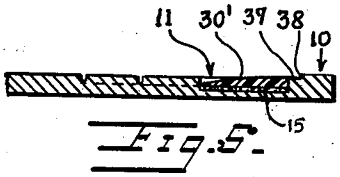
FIG. 5 is a view similar to FIG. 2 of the form of FIG. 4 attached to a disk record.

In use, the strip or tab 11 is attached to the top surface of the base portion of the countersunk portion 38 with the straight end edge 12 of the strip adjacent the starting ends of the tracks 41, 42 and 43. When the strip is so positioned, the outer edge 14 thereof is continuous with the peripheral edge of the record, and edge 16 is slightly spaced from the end of the first turn of track 41. The grooves 30', 31' and 32' on the strip will be continuous with the tracks 41, 42 and 43, respectively, and with the surface of the base of the countersunk portion flush with the outermost ends of the grooves 30', 31' and 32', which grooves gradually become deeper toward the straight edge 12 of the tab so that the innermost ends thereof are flush with the bases of the tracks 41, 42 and 43 as seen in FIG. 5. The portion of the base of the countersunk portion 38 outwardly of the tips 24', 25', 26' and 27' serving as the gateway 39 guides the needle into the notches 20', 21' and 22' and onto the pilot or guide grooves 30', 31' and 32' for movement onto the tracks 41, 42 and 43. Once the strip 11 is placed on the record, it serves as a permanent sound track selecting and guiding means.

Figure 4:
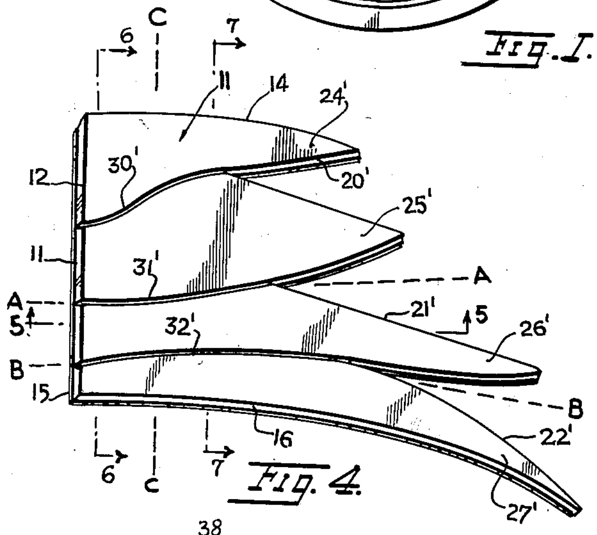
FIG. 4 is a top plan view of a modified form of needle guiding device adapted to be used with the disk record of the type shown in FIG. 1, on an enlarged scale.
Figure 3:
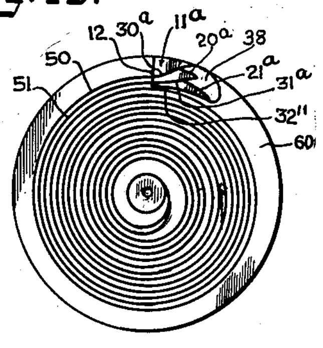
FIG. 3 is a view similar to FIG. 1 on a reduced scale of a two-sound track disk record.
Figure 7:
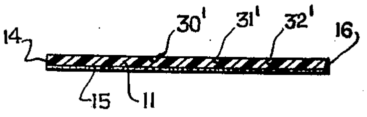
FIG. 7 is a vertical sectional view taken on the line C—C of FIG. 4.
Figure 6:
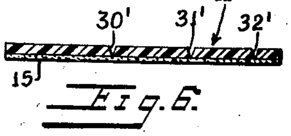
FIG. 6 is a vertical sectional view taken on the line 6—6 of FIG. 4.

FIG. 3 shows a strip or tab 11ᵃ placed on a double-track disk record 60 having two parallel sound tracks or grooves 50, 51 continuous with pilot or guide grooves 30ᵃ, 31ᵃ. The strip or tab is torn or cut along line A—A as indicated in FIG. 4, so that part of groove 32' forms the inner edge 31' of the strip or tab. Only two notches 20ᵃ, 21ᵃ are employed for the modified tab 11ᵃ.

Figure 8:
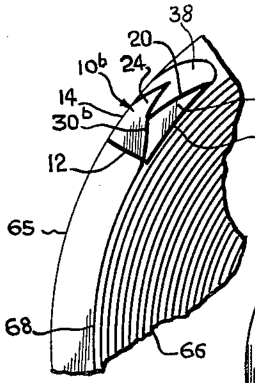
FIG. 8 is a top plan view of a fragment of a phonograph disk record embodying another modified form of the invention.

FIG. 8 shows part of a single-track disk record 66. The single track 68 is continuous with groove 30ᵇ of strip or tab 10ᵇ mounted on the peripheral edge of the disk record. The strip is formed by cutting strip 10 along line B—B of FIG. 4 at groove 32' so that part of this groove forms the inner edge 31'' of the strip while the outer edge 14 of the strip extends along the periphery 65 of the disk record.

Figure 9:
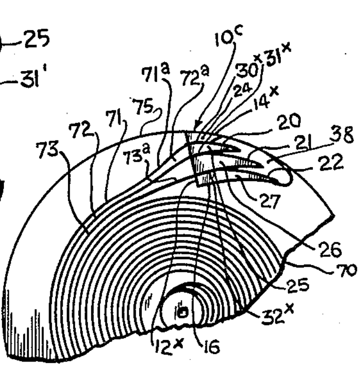
FIG. 9 is a similar view of still another modified form of the invention.

FIG. 9 shows part of a disk record 70 having three tracks 71—73. The starting ends 71ᵃ, 72ᵃ and 73ᵃ of the the tracks flare outwardly toward the peripheral edge 75 of the disk record. Strip or tab 10ᶜ is formed by cutting the strip or tab 10 transversely across line C—C in FIG. 4. This locates the starting points of grooves 30ˣ, 31ˣ and 32ˣ further apart at the cut edge 12ˣ in registration with the starting ends 71ᵃ—73ᵃ of the three grooves. Edge 14ˣ extends along edge 75 of the record.

Figure 10:
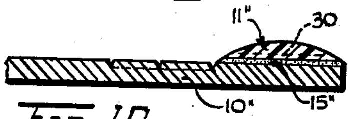
FIG. 10 is a view similar to FIG. 5 of yet another modified form of the invention.

The modified form of disc record 10'' shown in FIG. 10 differs from the disk record 10 in that the plastic adapter strip or tab 11'' instead of being placed on the base of a recess cut in the record is placed directly on the top surface of the disk body in which the sound tracks or grooves are cut. The strip or tab 11'' is fastened to the surface by the layer 15'' of pressure-sensitive material. The grooves 30'' in the strip or tab are continuous with the starting ends of the sound tracks on the record and guide the needle onto the sound tracks similarly to the grooves in the strip or tab 10.

The strip or tab is thus adapted to serve as a groove or track finder or selector for disk records having one or more tracks closely or widely spaced. As an article of manufacture, the strips or tabs can be packed in packages or pads of a dozen or more. They can be produced very cheaply and may be sold separately or may be provided gratis to buyers of records. If desired, the tabs can be mounted on the records at the place of manufacture.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A phonograph disk record comprising a thin circular body of plastic material having a plurality of concentric circular sound tracks cut in one surface thereof leaving a solid peripheral edge therearound, the surface of said peripheral edge being cut away adjacent the starting ends of the tracks, said cut-away portion having a straight end edge, the starting ends of the tracks intersecting the straight end of the cutaway portion, a thin plastic tab fastened flatwise on the surface of the base of said cut-away portion at the straight end thereof, said tab having a straight end edge abutting the straight end edge of the cut-away portion, the other end of the tab having V-shaped tips, said tips forming V-shaped notches therebetween, the surface of the body of the tab having pilot grooves leading from the apices of the V-shaped notches to the starting ends of the sound tracks for a phonograph needle, the other end edge of the cut-away portion being curved, the surface of the base of the cut-away portion adjacent the curved end edge being smooth and serving as a gateway leading to the V-shaped notches for a phonograph needle.

2. An adapter attachment for a multiple track phonograph disk record for guiding a phonograph needle to the sound tracks comprising a strip of thin plastic film, said strip having a plurality of spaced pilot grooves on one surface, the other surface of the strip being coated with an adhesive to adhere to the disk record, the grooves extending longitudinally of the strip and terminating at opposite end edges thereof, said strip having longitudinal side edges extending parallel to each other with an inner side edge having a smaller radius of curvature and an outer side edge having a larger radius of curvature, one of the end edges being straight and extending radially to the inner and outer side edges, the other end edge being formed with a plurality of V-shaped notches, apices of said notches coinciding with the ends of the grooves thereat, said grooves being spaced wider apart at the apices of the notches than at the straight end edge, so that the strip can be cut transversely to effect registration of the grooves with widely spaced ends of sound tracks of a multiple track record, said notches being defined by progressively longer tips from the inner side edge to the outer side edge.

References Cited in the file of this patent

UNITED STATES PATENTS

| | | |
|---|---|---|
| 1,112,838 | Rogers | Oct. 6, 1914 |

FOREIGN PATENTS

| | | |
|---|---|---|
| 22,549 | Great Britain | Oct. 12, 1911 |
| 729,161 | Germany | Dec. 10, 1942 |
| 1,055,385 | France | Oct. 14, 1953 |